(12) United States Patent
Hess et al.

(10) Patent No.: US 6,389,332 B1
(45) Date of Patent: *May 14, 2002

(54) INFORMATION SYSTEM AND PROCESS IN A VEHICLE

(75) Inventors: Markus Hess, Stuttgart; Siegfried Rothe, Denkendorf, both of (DE)

(73) Assignee: DaimlerChrysler AG, Stuttgart (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/561,902

(22) Filed: May 1, 2000

(30) Foreign Application Priority Data

Apr. 29, 1999 (DE) .......................................... 199 19 216

(51) Int. Cl.[7] ................................................. G06F 7/00

(52) U.S. Cl. ........................................... 701/1; 701/36

(58) Field of Search ............................... 701/1, 29, 36; 340/500, 521, 523

(56) References Cited

U.S. PATENT DOCUMENTS

| 4,962,570 A | * | 10/1990 | Hosaka et al. | ............... 123/399 |
| 5,453,929 A | * | 9/1995 | Stove | .................... 364/424.01 |

FOREIGN PATENT DOCUMENTS

| DE | 41 40 864 | 12/1991 |
| DE | 195 07 997 | 3/1995 |
| DE | 297 10 675 | 8/1997 |

* cited by examiner

Primary Examiner—Yonel Beaulieu
(74) Attorney, Agent, or Firm—Crowell & Moring LLP (57) ABSTRACT

In an information system for a vehicle having a plurality of information sources for outputting a respective associated information signals when an associated information-generation condition is met, two or more vehicle-control information sources of different types are coordinate with one another, without conflict, in terms of their information output in such a way that at any time at most one of these vehicle-control information items is output. As an alternative, or in addition vehicle-control information signals and non-vehicle control information signals can be prioritized according to a plurality of sequentially processed urgency levels. The vehicle-control information signals are assigned higher urgency and the non-vehicle-control information signals are assigned lower urgency.

11 Claims, 9 Drawing Sheets

INFORMATION SYSTEM AND PROCESS IN A VEHICLE

BACKGROUND AND SUMMARY OF THE INVENTION

This application claims the priority of German patent document 199 19 216.2, filed Apr. 29, 1999, the disclosure of which is expressly incorporated by reference herein.

The invention relates to an information system in a vehicle.

Such a system comprises a plurality of information sources which output an information signal upon the occurrence of a certain specified condition. (The information-generation condition is necessary, but not always, which is however not sufficient to cause an output of the associated information signal.) The output information signal is made available to the occupants of the vehicle (particularly the driver) for the purposes of informing them.

Depending on the type of information which is signalled, it may require the vehicle occupants or the driver to take specific action—immediately, in the medium term or in the long term—or may merely need to be noted. Information which requires an immediate response from the driver of the vehicle may include, for example, warning information from so-called driver assistance systems which assist the driver with instantaneous vehicle-control (such as a distance control device, a blind spot monitoring unit or more generally a lane-changing aid, a bend warning device and a device for automatic lane detection) Typical information which requires reaction only in the medium-term or long-term (i.e., not before, for example, several seconds have passed) comprises not only typical operational fault messages, such as those relating to low engine oil level, a defective lamp etc., but also, for example, a telephone call signal. Typical information which does not require any particular vehicle-related action includes, for example, numerous types of operational status information relating to whether specific vehicle components are activated or deactivated at a given time, as well as music and voice information which is made available by electronic entertainment equipment. "Event information", such as typical warning information, which is output only a short time after the relevant event has occurred, and longer lasting "continuous information", such as that from electronic entertainment equipment, can be differentiated depending on the typical duration of the outputting of the information.

In more modern motor vehicles, the number of individual information systems is increasing continuously, for example, to relieve and support the driver in operating the vehicle and to entertain the passengers. For this purpose, a quantity of warning information and other information is made available optically, acoustically, haptically (in a tactile fashion), by smell, as taste information, as perceptible temperature information etc. As a result, there is the danger of an information overload, entailing the risk that, for example, an important information item is not perceived by the driver because he is distracted by less important information.

The latter difficulty is countered in conventional systems only to a very limited degree by weighting or prioritizing specific messages. Thus, it is known, for example, to switch the car radio to a mute setting when a telephone call is received, or to reduce the loudspeaker volume of the radio when the navigation system issues a voice instruction. On the other hand, in conventional systems, warning messages are issued simultaneously by different types of driver assistance systems such as distance controllers, curve warning devices and automatic lane detectors, simultaneously if a particular driving situation is met. In addition, conventionally, less important information can be output simultaneously with information which requires a rapid vehicle-control reaction from the driver, and which will be referred to below as vehicle-control information. Thus, information (warning of an automatic lane detection, for example) in the form of a studded belt rattle, and additionally a telephone call tone may be issued simultaneously with the acoustic warning tone of a distance control device.

The German Patent Document DE 41 40 864 A1 describes a device for providing multifunctional diagnostic display in a motor vehicle. It includes a display device and an electronic module which controls the latter, and receives over an appropriate interface a number of fault signals which are emitted by respective fault information sources. The module controls the display device in such a way that at any time only one of the fault signals is displayed on the common display device even if at the particular time a plurality of fault information sources are outputting their respective fault signals to the module. Furthermore, a switching which can be actuated by the user so that when a plurality of fault signals are present simultaneously they can be displayed successively. For this purpose a priority of the fault signal information is prescribed.

A comparable procedure for displaying multiple information items with different display priorities on a display panel is described in the German Patent Document DE 195 07 997 A1. When several display information items which are output by various information sources are present simultaneously, an information item with a high display priority. (preferably a warning signal) is displayed in the form of at least one symbol which can be changed by an operator. When several such information items which are to be displayed with a high display priority occur simultaneously, the symbol for the first displayed information item is replaced, upon activation by the user, by a symbol which represents the number of existing information items with high display priority.

One object of the invention is to provide an information system of the type mentioned above, which protects a vehicle occupant against an information overload, even in the presence of a large number of information sources, and in particular ensures that the vehicle occupant can perceive particularly important information which relates to the control of the vehicle or which is critical for safety, without being distracted by other information.

This and other objects and advantages are achieved by the information system according to the invention, in which the conditions necessary for outputting information are specifically coordinated with one another for the various types of vehicle-control information sources (such as a distance control device, lane-changing aid, automatic lane detector, curve warning device and parking aid), in such a manner that at any time at most one of these generation conditions is met. Therefore, at most one of these vehicle-control information sources outputs an associated vehicle-control signal. This conflict-free configuration of the various vehicle-control information sources ensures that the driver is not encumbered at any time with more than one vehicle-control signal to which he must react immediately to ensure safe vehicle control (and which he should therefore perceive with a high level of reliability). This makes it possible, for example, to prevent the output of a warning signal of the automatic lane detector simultaneously with a curve warning information item if the driver is attempting to deal with the critical curve situation by cutting the corner. Also, a warning signal from the automatic lane detector can be prevented from occurring simultaneously with a distance warning if the driver wishes to deal with the critical distance situation by overtaking, without previously switching on his indicator lights.

In another embodiment of the information system according to the invention, the information which can be output by the information sources is prioritized according to various urgency levels under the control of an appropriately configured information management unit. Thus, vehicle-control information which demands a rapid reaction from the driver is associated with a primary urgency level; while other information which does not require such a rapid reaction is subordinated in one or more secondary urgency levels. The information management (which may be a central unit or may be distributed over a plurality of vehicle components) permits the less important information from the one or more secondary urgency levels to be output either with reduced intensity or not at all, as long a vehicle-control information item of the primary urgency level is being output. This ensures that the driver can perceive an important vehicle-control information item with a high degree of reliability without being distracted by other types of less important information.

In another embodiment of the invention, the information management unit perform sequential processing; that is, it outputs information of different urgency levels with descending priority. In order of decreasing priority, the urgency levels are assigned increasing response reaction times which represent typical driver reaction times to the respectively output information.

In still another embodiment of the invention, the information management unit ensures sequential processing of information within each of the one or more secondary urgency levels, provided that the respective information-generation conditions are met in parallel. Therefore, even during the processing of multiple information items which are to be output, and which are jointly associated with a secondary urgency level, the vehicle occupant is encumbered at any time by just one of these information items, which he or she can perceive with the corresponding level of reliability, without being distracted.

Yet another embodiment of the invention provides for suppression of acoustic signalling of primary information during the outputting of a primary vehicle-control information item and/or a reduction of its intensity during the outputting of other higher-priority information which does not relate to the control of the vehicle.

In another embodiment, urgency gradation of the navigation information which is output by a navigation system is provided in at least two levels. As a result, navigation information which will become relevant at an earlier time, for example relating to the route after approximately one hundred meters, can be displayed with a higher level of priority than navigation information which will only become relevant later, for example information relating to the route after several hundred meters at the earliest.

Finally, still another embodiment provides for an emergency call signal, which can, for example, be transmitted from a control centre to the vehicle and output there in accordance with a driver's request. Such signal is output with maximum priority and with precedence over, or at least in parallel with one of the other information items.

Other objects, advantages and novel features of the present invention will become apparent from the following detailed description of the invention when considered in conjunction with the accompanying drawings.

DETAILED DESCRIPTION OF THE DRAWINGS

Figure 1:
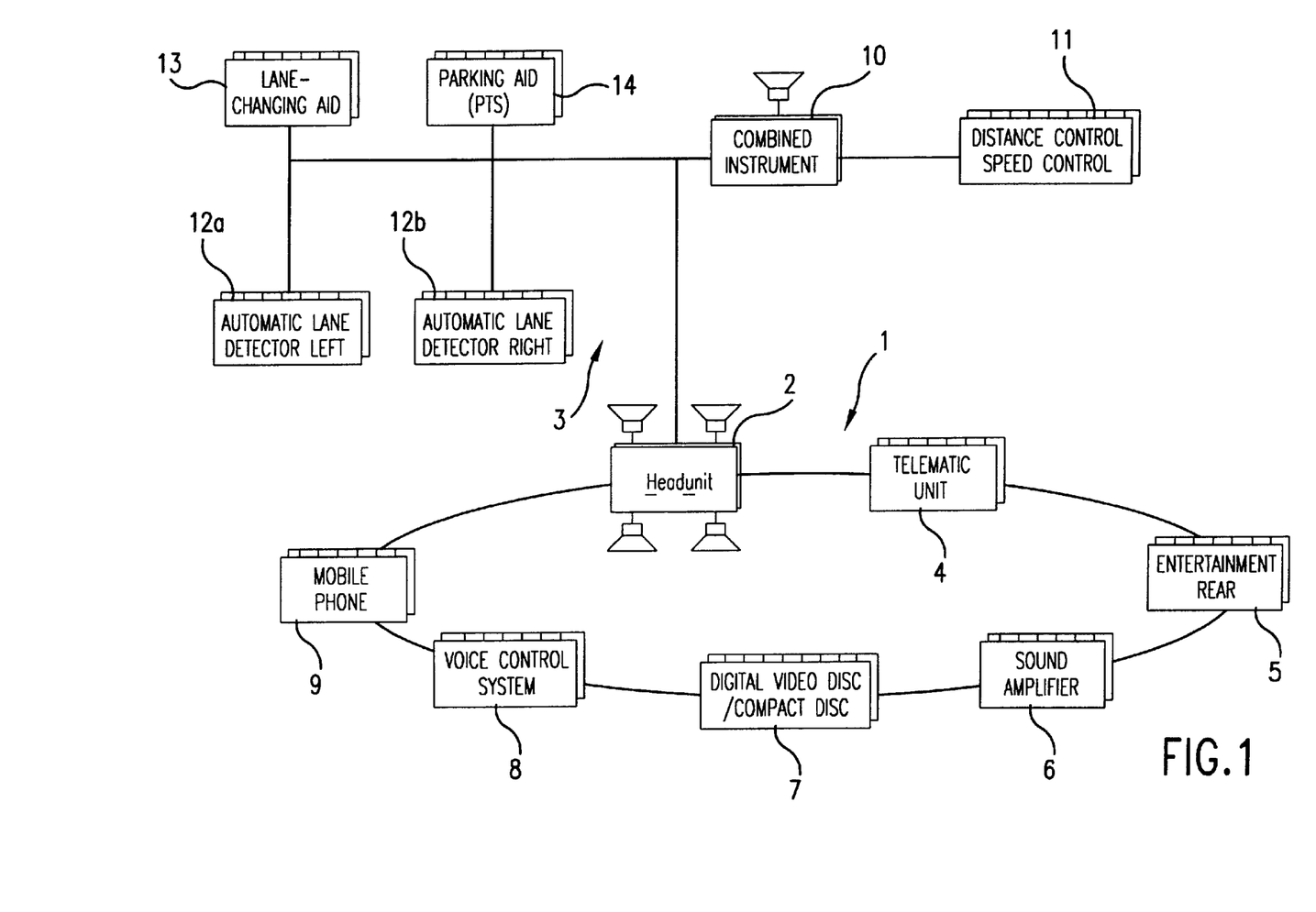
FIG. 1 shows a schematic block diagram of the network structure of a networked information system in a vehicle.

FIG. 1 shows the databus-networked structure of a distributed information system which is implemented in a vehicle. The information system includes a plurality of components which are of conventional design and which are connected to one another, as required, by means of a single databus or by means of a plurality of databuses which are coupled to one another. As shown, the information system specifically includes a telematic bus 1 with an interface unit 2 via which it is coupled to a CAN bus system 3. As shown, the components of the telematic bus 1 include a telematic central unit 4 (which, depending on the configuration of the system, contains a navigation device, a curve warning device, an Internet communication device etc.), a rear entertainment unit 5 for entertaining vehicle occupants in the rear of the car, an audio amplifier 6, a DVD and/or CD entertainment electronic component 7, a voice control system 8 and a telephone component 9.

In the CAN bus network 3 there is a so-called combined instrument 10, which is conventionally used among other things as a central information output device for outputting multiple optical and audible signals which are fed to it by the various vehicle-mounted components via the databus. Furthermore, a distance control device 11, an automatic lane detector with components 12a, 12b respectively for the left-hand and right-hand sides of the vehicle, a lane-changing aid unit 13 and a parking aid unit 14 as well as further conventional components (not shown) are connected as required to the CAN bus system 3.

A characteristic information management system with information prioritization is implemented in the information system shown, as explained below with reference to FIGS. 2 to 7. The information management system is implemented in accordance with a predefinable priority list, with different urgency levels for the various information items to be communicated to the vehicle occupants (in particular, the driver of the vehicle) by appropriate information management means. It can be implemented as a central unit, separately from the other components in FIG. 1, integrated into one of such components, or implemented as intelligence distributed between a plurality of these components.

Figure 2:
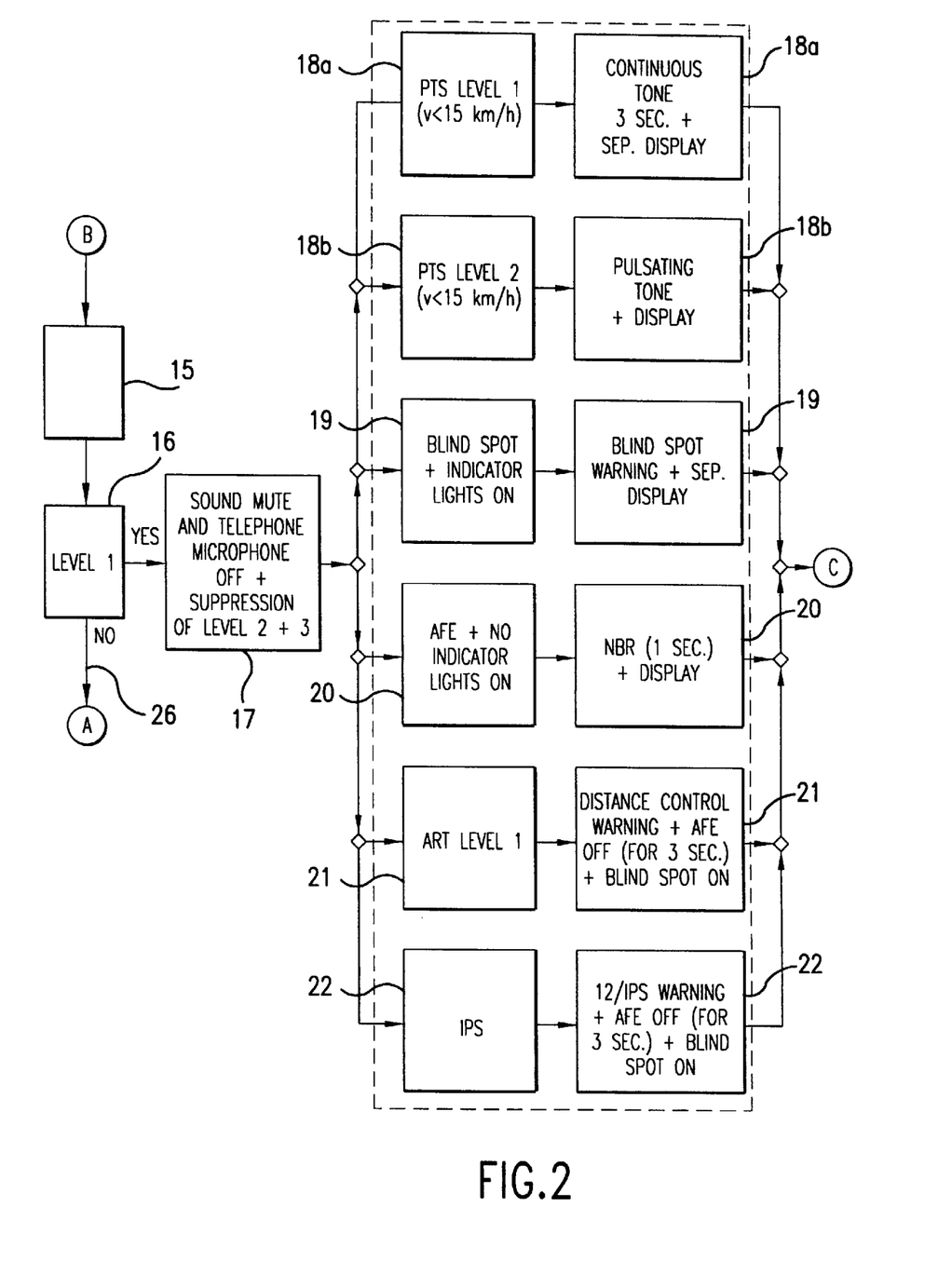
FIGS. 2 to 7 show respective block diagram elements for the information system in FIG. 1.

The information management means, which are represented in FIG. 2 as a function block 15, analyze information from the various information sources which is necessary for the desired information management, and output the information, classified according to different priorities or urgency levels, as is apparent from the information flowchart which emerges from all of FIGS. 2 to 7, and in which the arrow lines represent the processing over time.

The various information items which can be output when specified generation conditions are met are divided, for example, into three urgency levels of decreasing urgency. For this purpose a corresponding priority list is stored in the information management means 15. The information management means 15 implements an information output cycle, in which they first select the first, primary urgency level 16 (with the highest information outputting priority), and interrogate to determine whether information of this urgency level is ready to be output. If so, an audible output from electronic entertainment components which may be switched on, and from a telephone microphone, is suppressed (specifically switched to a mute setting—"sound mute"). In addition, the outputting of information from the two lower urgency levels, represented by an associated function block 17 in FIG. 2, is also suppressed.

The present information with the highest urgency level is then output. This includes information from a group of vehicle-control information sources which comprise various types of driver assistance systems, and all of which output vehicle-control-related information that requires a rapid reaction from the driver; specifically, a multi-stage parking aid (PTS) 18a, 18b, a lane-changing aid 19 with monitoring of the blind spot and rear space, an automatic lane detector (AFE) 20, a distance control device (ART) 21 and a bend warning device (IPS) 22. A first level 18a of the parking aid with considerable warning intensity generates a continuous tone for a predefinable time period in conjunction with a separate optical display if an obstacle is detected at a distance less than a first distance threshold value from the vehicle when the vehicle is being parked with a vehicle speed which is lower than a predefinable threshold value, while a second level 18b generates a pulsating tone in conjunction with a visual display if an obstacle is detected at a distance greater than the first, but smaller than a second predefinable distance threshold value during such a parking operation.

The lane-changing aid 19 outputs an audible warning in conjunction with a separate visual display as vehicle-control information if, when the vehicle is traveling with a velocity higher than an associated threshold value (for example, 50 km/h) with the indicator lights switched on, another vehicle is detected in the area to the rear or in the blind-spot region, making a lane change possibly risk-free at that particular moment. The audible warning can be output, for example, as a single horn tone or a double horn tone, solely or in conjunction with the simulated noise of a vehicle traveling past.

The automatic lane detector (AFE) 20 outputs appropriate warning information relating to the vehicle leaving a lane if the turn signal lights have not been switched on, because this is interpreted as a lane change which is not intended by the driver, for which such a warning notification should not be given. As a warning signal, the automatic lane change detector (AFE) emits a studded belt rattle (NBR) for a predefined time period of, for example, 1 s in conjunction with a visual display.

For the maximum urgency level, the distance control device (ART) is embodied as a first level 21 which generates a distance warning if, when it is traveling with a velocity above an associated threshold value (for example, 40 km/h), the vehicle drops below a predefined distance threshold value from a vehicle traveling in front. At the same time, when the distance warning signal is emitted, the information management means keeps the automatic lane detector (AFE) inactive for a predefined time period (for example, 3 s), while on the other hand the blind-spot warning device is activated without the indicator lights being switched on. This arrangement avoids the automatic lane detector (AFE) undesirably emitting its studded belt rattle information if the driver wishes to overcome the problematic distance situation by moving out in a lateral direction and has not switched his indicator lights on when doing so. The monitoring of the blind spot permits a vehicle which may be located in the blind-spot or rear-space region to be detected in good time, and then, if appropriate, emits its respective warning information so that after the outputting of the distance warning signal, has been terminated, the driver is informed in good time that it is not possible to move out in a lateral direction at that moment.

The curve warning device 22 emits an associated curve warning if it detects that the vehicle may experience a state which is critical in terms of movement dynamics when it travels through an immediately imminent curve. At the same time, in this case, the information management means switches off the automatic lane detector (AFE) for a predefinable time period (for example, 3 s), and switch on the lane-changing aid (TW). This measure enables the driver to counteract the critical curve situation by cutting the corner without switching on the indicator lights and without this causing the automatic lane detector (AFE) to be triggered. The lane-changing aid (TW) checks whether the rear-space and blind-spot region is free and permits the corner to be cut, or checks whether there is a vehicle there. If so, it emits its warning signal, which informs the driver that he must deal with the critical curve situation in another way.

As becomes clear from the above illustration, the various vehicle-control information sources 18a, 18b, 19 to 22 are matched to (coordinated with) one another based on their information output behavior, without conflict, in such a way that at any time at most one of them emits its respective vehicle-control-related warning information which demands a rapid reaction from the driver. This arrangement prevents the driver from being presented simultaneously with two or more such warning information items with a maximum priority and a short reaction time—which would otherwise make it difficult for him to react correctly.

Figure 3:
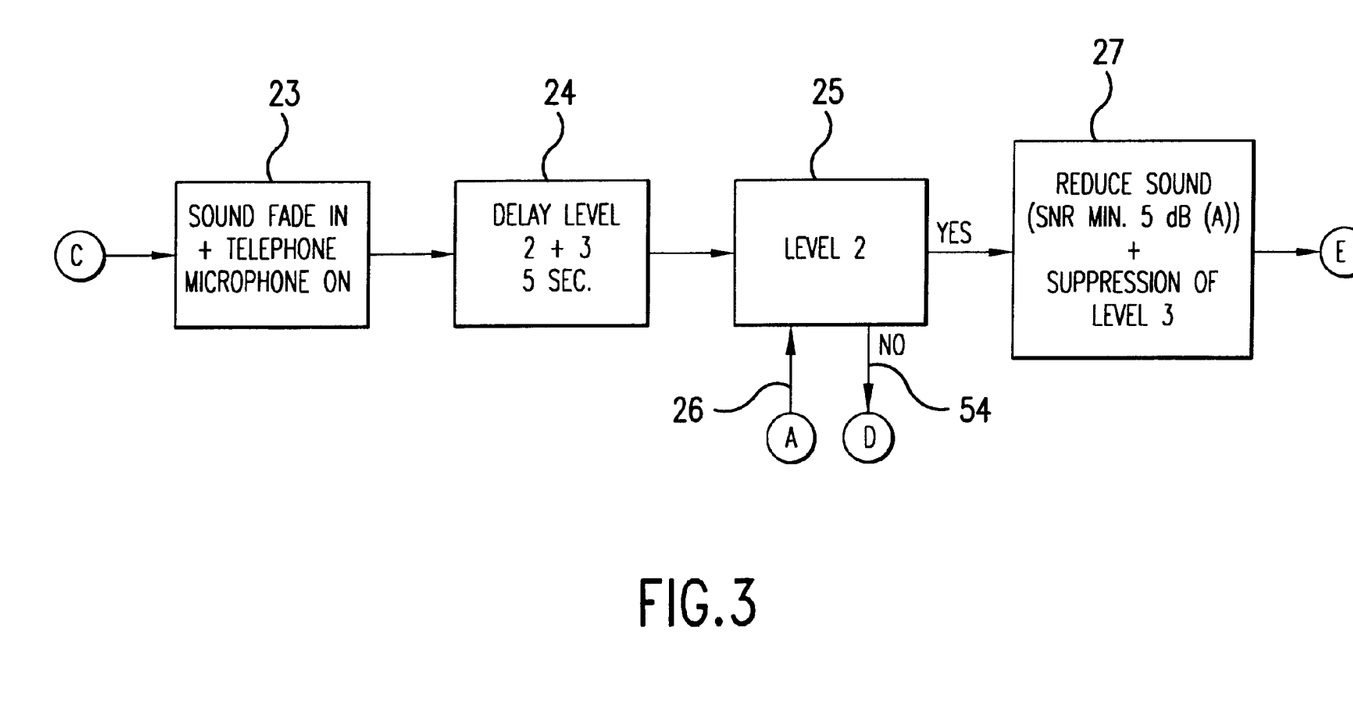

As soon as there are no more vehicle-control-related information items with the maximum urgency level, the previous switching to a mute setting is terminated and the telephone microphone is switched on again, as is illustrated in block 23 in FIG. 3. At the same time, a delay level 24 delays the change-over to the next priority level 25 (with the second-highest priority) by a predefinable interval time (for example, 5 s) in order to provide sufficient time after an information item with the first urgency level has been output before an information item of the second urgency level is output. The delay interval makes it easier for the driver to absorb the information. If no information of the first urgency level 16 is waiting to be output even at the beginning, the system jumps directly to the second urgency level 25, as symbolized with an arrow line 26.

If information of the second urgency level 25 is to be output, initially the loudspeaker volume of the continuous audible information is reduced, so that, for example, the continuous audible information in the particular frequency band is at least 5 dB quieter than the information which is to be output, and all the information of the third (lowest) urgency level is suppressed at the same time, as is symbolized by block 27 in FIG. 3.

Those information sources whose information also demands a prompt reaction from the driver (but not with the very short reaction time demanded in the most urgent level 15 of, for example, at most 2 s, but rather with a somewhat longer medium-ranking reaction time of for example between 2 s and 5 s) are assigned to the second, middle-ranking urgency level 25. The various information sources and the information of this urgency level which can be generated by them, are illustrated grouped according to a typical driving mode sequence in FIGS. 4 to 6.

Figure 4:
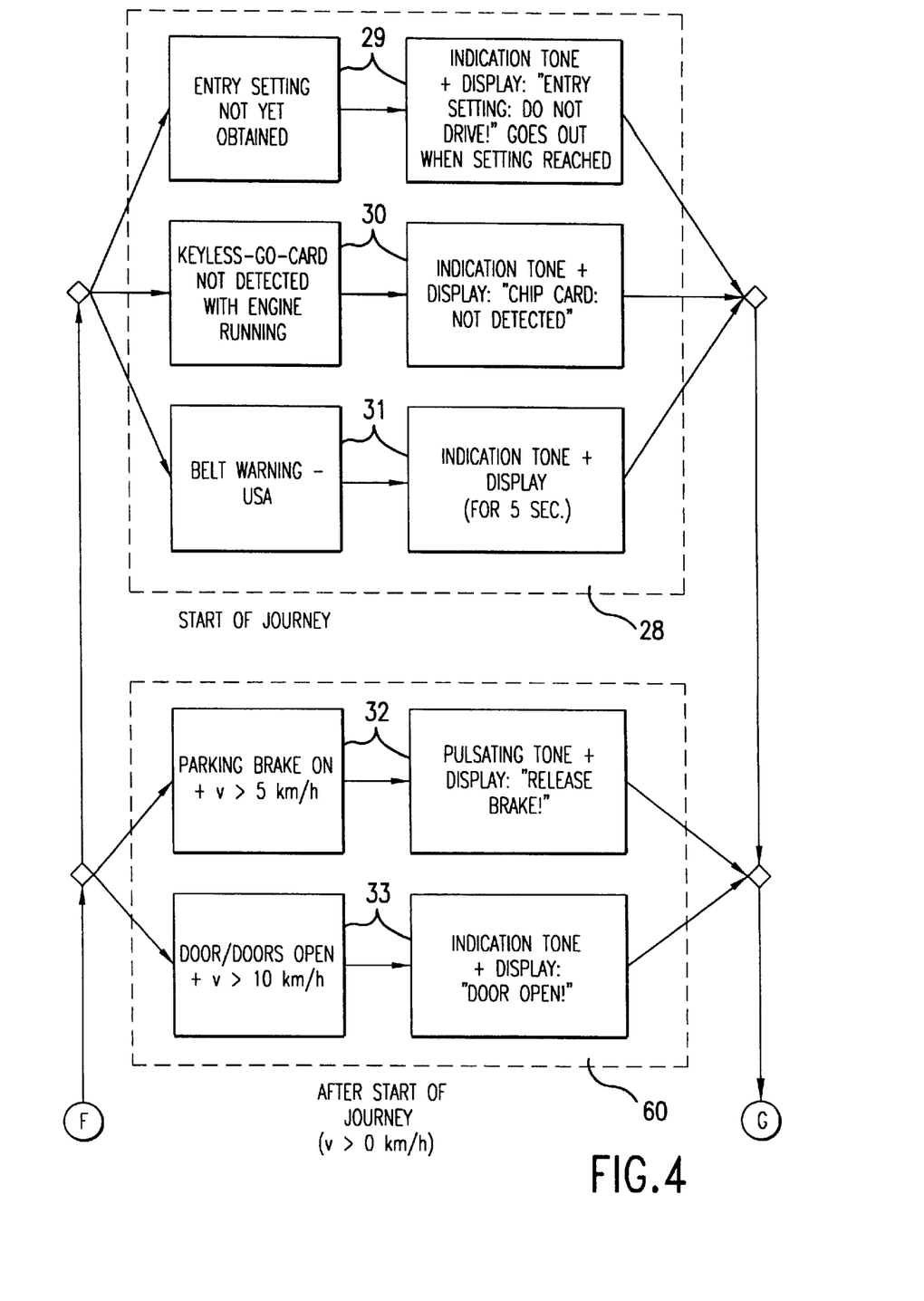

A first group 28 relates to information which is typically relevant at the start of a journey. This is specifically, information of an automatic setting system 29 which performs, for example, person-specific settings of the driver's seat, an authentication monitoring unit 30 which monitors the presence of an authentication element such as a so-called "keyless-go-card" when the engine of the vehicle is running, and a seatbelt warning system 31 which is used in particular in the USA. If the desired initial setting has not yet been achieved after the vehicle occupant or occupants have gotten into the vehicle, the setting system 29 emits an appropriate indication tone together with a visual text display as a warning. (This information is canceled as soon as the preprogrammed setting is obtained.) When the authentication element is not detected, the authentication detection device also emits a warning tone together with a visual text display. In the same way, the information of the seatbelt warning system 31 which indicates that the belt has not yet been put on is composed of an indication tone and a visual display for a predefined time period of, for example, 5 s.

A second information group 60 of the medium-ranking urgency level 25 relates to the situation just after the start of the journey. It comprises a parking brake monitoring system 32 and a door opening monitoring system 33. The parking brake monitoring system emits a pulsating tone together with a visual text display as a warning if it detects that the parking brake is still on although the vehicle is already traveling at a velocity of, for example, more than 5 km/h. The door monitoring system emits a warning tone and an associated visual text display if one or more doors are still open although the vehicle is already traveling at a velocity of, for example, more than 10 km/h.

Figure 5A:
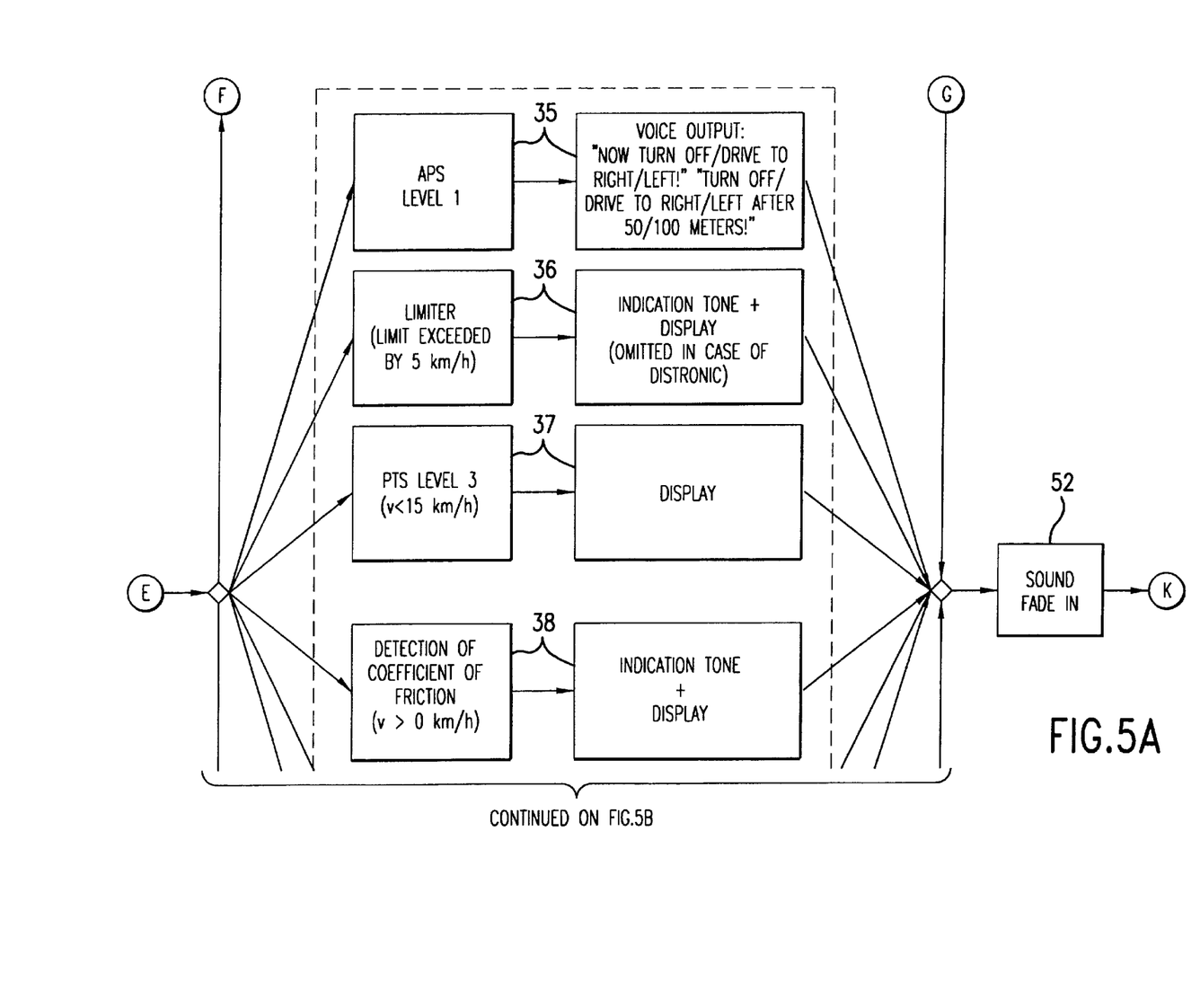
Figure 5B:
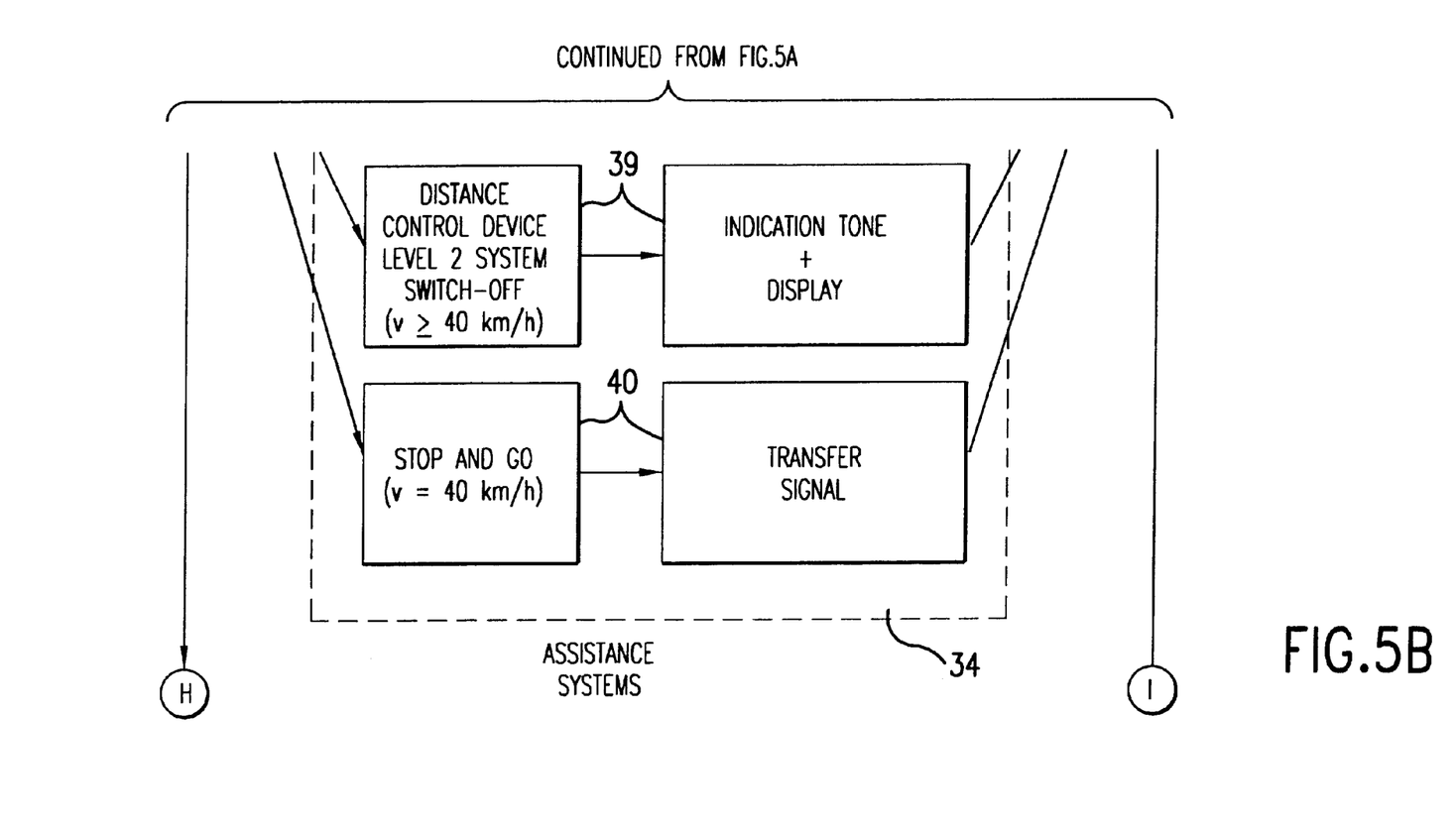

A third information group 34 which is illustrated in FIG. 5 includes assistance-system-related information with a corresponding, medium-ranking urgency level. Specifically, it comprises a first level 35 of a navigation device (APS), a maximum velocity monitoring system 36, a third level 37 of the parking aid (IPS), a unit 38 for detecting the coefficient of friction, a second level 39 of the distance control device and a stop&go distance control transfer display 40. The first level 35 of the navigation system generates, as information which is to be output, a voice output which informs the driver of the route typically for the next hundred or two hundred meters, and in particular of necessary turning maneuvers.

The maximum velocity monitoring system 36 emits an associated indication tone together with a visual display if the actual velocity of the vehicle has exceeded a settable, instantaneously admissible maximum velocity by a predefinable amount, this warning information can be emitted, if appropriate, if a distance control system ("Distronic") is present. The third level 37 of the parking aid (IPS) emits an item of visual warning information if the distance between a detected obstacle and the vehicle is greater than the second distance threshold value of the second level but less than a predefinable third distance threshold value.

The unit 38 for detecting the coefficient of friction emits an indication tone together with a visual display if a critical coefficient-of-friction situation, in particular split $\mu$, is detected when the vehicle is traveling. The second level 39 of the distance control system (ART) also emits an indication tone together with a visual display if the distance control system has switched off when the velocity of the vehicle is still above the respective threshold value. The stop&go distance control transfer display 40 generates a transfer signal if the velocity of the vehicle exceeds an associated threshold value and the previous stop&go distance control mode thus changes to the normal distance control mode of the distance control device (ART).

Figure 6A:
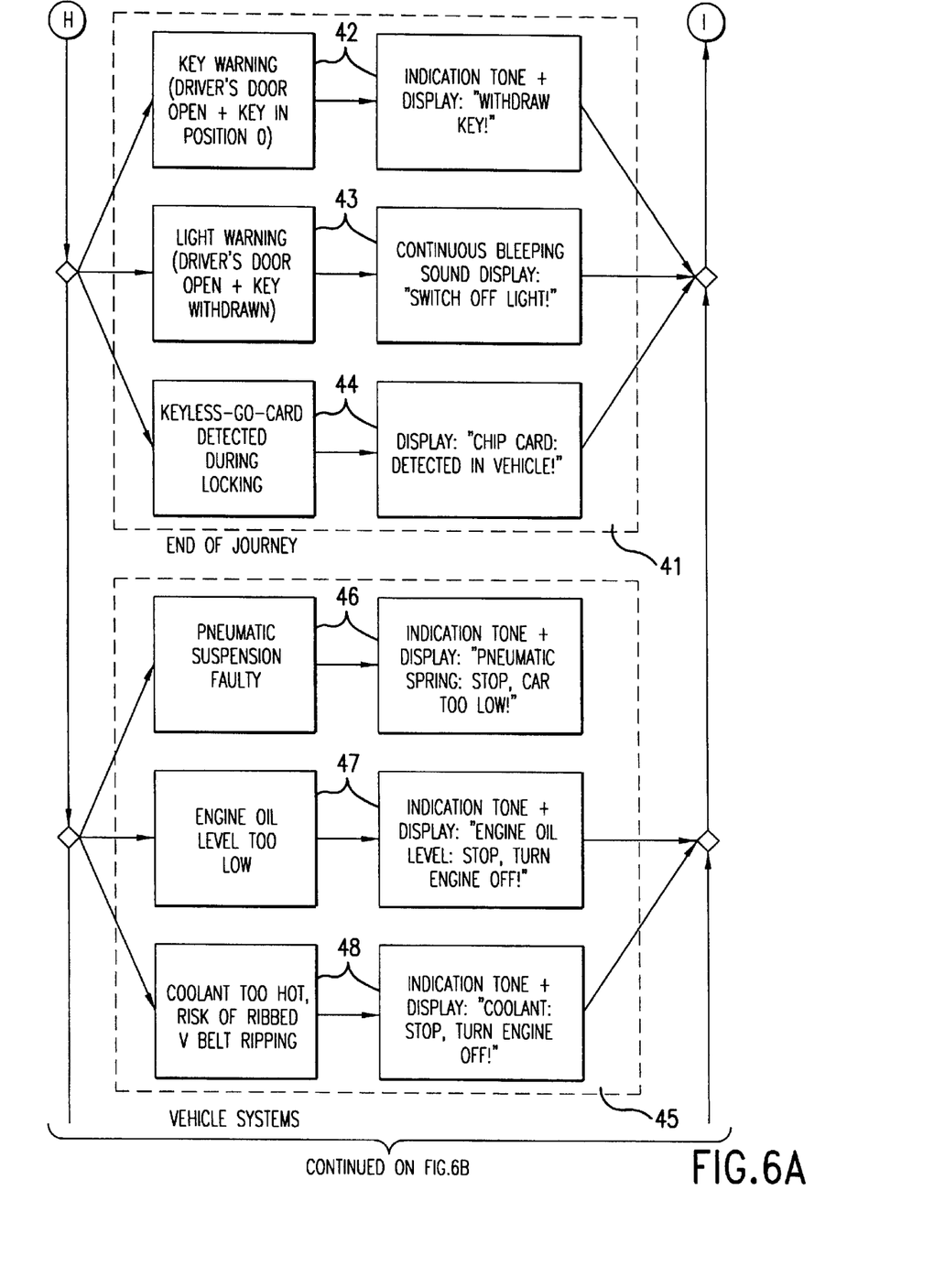
Figure 6B:
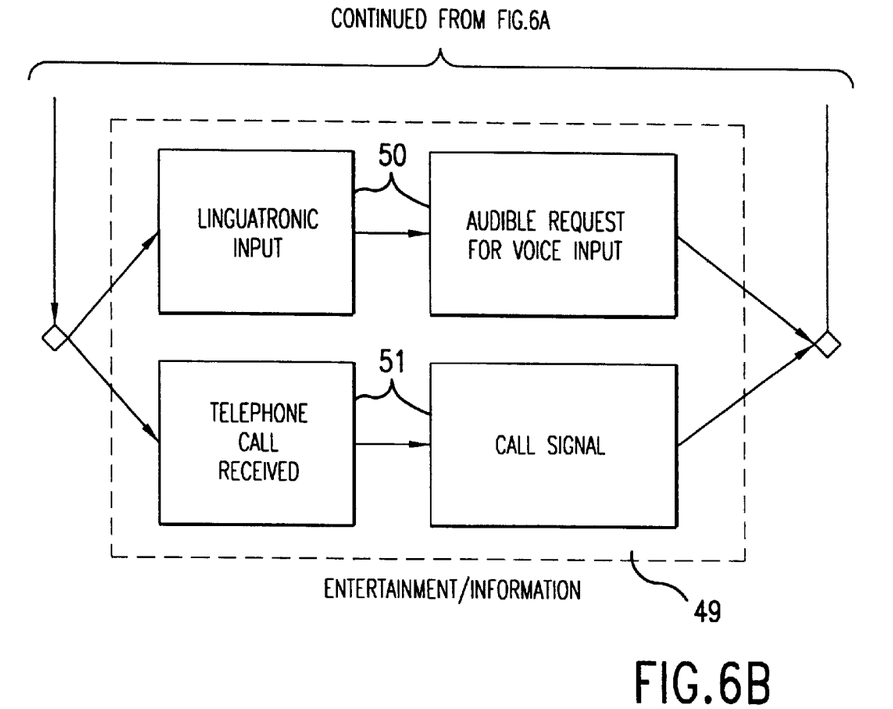

A fourth to sixth information group 41, 45, 49 with medium-ranking urgency level is illustrated in FIG. 6. A fourth group 41 of these relates information which is typically relevant at the end of a journey and comprises a key warning system 42, a light warning system 43 and a further authentication-element-related information source 44. The latter consists of monitoring of the interior of the vehicle for the presence of an authentication element, such as the above-mentioned "keyless-go-card" after the vehicle has been locked, in which case it outputs an appropriate visual display. The key warning system 42 emits an indication tone together with a visual text display if it detects that the driver's door is open but the ignition key is not yet in the "0" position. The light warning system 43 emits a continuous bleeping sound together with a visual text display if it detects that the driver's door is open and the key has been withdrawn, but a vehicle light is still switched on. A fifth group 45 relates to specific vehicle system components and comprises a pneumatic spring sensor system 46, an engine oil level sensor system 47 and a coolant temperature sensor system 48. If an abnormal operating state relating to this is detected, all three sensor systems output respective indication tones, together with an appropriate visual text display. A sixth group 49 comprises a voice input system 50 which, in the case of certain information, makes an audible request for a voice input, and a vehicle telephone system 51 which generates a call signal information item when a telephone call is received.

The above explanation of the totality of all the information items of the middle-ranking urgency level makes it clear that their generation conditions may overlap in time. The information management means then ensure that, nevertheless, at most one of these information items is output, and thus drawn to the attention of the vehicle occupant at any time during the processing of the medium-ranking urgency level. For this purpose, the information management means classifies all second-urgency-level information present in parallel in the respective processing cycle into an output sequence according to a predefined priority list, and controls the outputting of this information in such a way that it is output successively in accordance with this priority list.

In a preferred implementation of the priority list, the information which is output by the combined instrument 10 is given the highest priority. This includes all of the above-mentioned information, with the exception of that of the first level 35 of the navigation device (APS), the telephone system 51 and the voice input system 50. The three last-mentioned information items are subordinated to this combination-instrument information with descending priority in this sequence. If a plurality of combination-instrument information items which are mainly fault warning signals are present in parallel, the sequential processing includes their cyclic visual display for, in each case a predefined minimum period (for example, 5 s), and in each case only the initial visual displays accompanied by the associated audible indication tone. Of course, the output of such information is terminated at the latest when the preset conditions therefor are no longer met; for example, when the fault is cleared.

Figure 7:
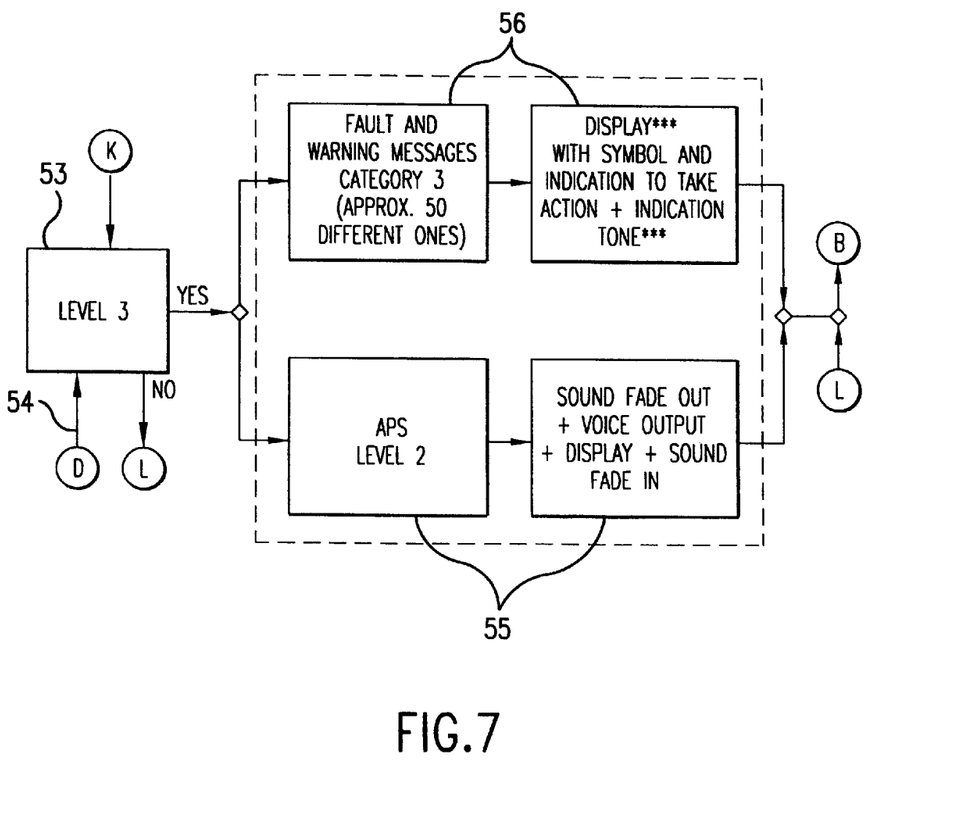

As soon as all the present information of the second urgency level has been processed in this way, the loudspeaker volume reduction is terminated (Block 52 in FIG. 5), and the system is then switched to the third (lowest) urgency level 53, as illustrated in FIG. 7. If there is no information of the middle-ranking urgency level to be output right from the beginning, the system is switched directly from the second to the third urgency level 53, as indicated by an associated arrow line 53.

The information assigned to the third urgency level 53 requires at most a moderate reaction time, which is longer than the upper reaction time threshold of the middle-ranking urgency level. This includes, in the first instance, a second level 55 of the navigation device (APS) and, in the second instance, a multiplicity of fault messages and warning messages (represented by a block 56) relating to specific brief and relatively noncritical malfunctions of the light system, the brake system, etc. The outputting of the information for this fault and warning message group 56 is effected in each case as a visual symbol with an indication of the action to be taken, and by an indication tone. The second level 55 of the navigation device (APS) outputs routine selection information for the route, typically starting from several hundred meters in visual form and in voice form; for this purpose a continuous audible information item which may be activated is switched to a mute setting for the corresponding time period. This mute setting can also optionally be provided for the outputting of information of the fault and warning message group 56.

The information management means also prevents parallel generation of multiple information signals of the third urgency level, by controlling its outputting sequentially according to a predefinable priority list. Here, the information of the second level 55 of the navigation device (APS) is assigned the higher priority, and the other fault and warning messages 56 which are output via the combined instrument 10 are assigned the lower priority. If a plurality of fault and warning messages of the third urgency level are present in parallel in the combined instrument 10, they are displayed alternately, each for at least a specific time period, for example 5 s, according to a predefined sequence. In this context it is possible to provide for acknowledgment of fault messages which are held in a fault memory until the associated fault is cleared or the end of the journey is reached.

Of course, all conventionally known types of signals can be used for outputting the information, such as visual, audible, olfactory, haptic (tactile), taste and temperature-sensitive means. In order to differentiate the audible warnings of the first (maximum) urgency levels sufficiently from other acoustic sources, the latter are switched to a mute setting as long as an audible warning of the first urgency level is output. In order to ensure that they are perceived, audible warnings of the second and third urgency levels should be output with a sufficient signal-to-noise ratio (for example, at least 5 dB); for this purpose, if appropriate, the loudspeaker volume of other acoustic sources is correspondingly reduced. For controlling the distance from other vehicles, the preferred audible messages are imperative voice outputs such as "Stop", "Halt" and "Brake"; likewise for the parking aid system. For the curve warning system, in addition to the generation of an accelerator pedal movement as haptic information, olfactory information in the form of smells of burnt rubber or boiling cooling water or audible information in the form of a noise like clinking glass or a loud bang or a noise of screeching brakes are possible.

Supplementary information outputs in the form of text information, which is presented on a display and may be supplemented where necessary with more wide-ranging voice information that can be called up, can be provided as a further option for systems with, for example, legally prescribed visual warning information output, such as by means of the lighting up of a respective symbol.

In parallel with the prioritized information items mentioned above, as a further maximum priority information item to be output it is possible to provide an emergency-call information item with a so-called "Tele-Aid" system; the latter may be output in parallel with the information of the first urgency level, or even with precedence over the latter. In a further supplement, the outputting of the vehicle-movement dynamic system information, for example from an ESP system, can be suitably output via the information management system. This information can comprise, in particular, information indicating whether the respective vehicle-movement dynamic system is active or inactive and whether, when the vehicle-movement dynamic system is active, the instantaneous driving situation can or cannot be dealt with solely by that system, within a normal operating range. Depending on the type of this information, it can be assigned to a suitable urgency level.

Of course, in addition to the example specifically described above, numerous other ways of implementing the invention are possible; and all possible conventional methods of outputting can be used to communicate information; also, a specific assignment of certain methods of outputting to specific urgency levels can be provided.

It is characteristic of the information system according to the invention that when a plurality of vehicle-control-related information items which require a short reaction time are present, the outputting of their information signals can be configured free of conflict, so that at most one such information item is generated and output at any time. Also, different urgency levels can be assigned to the existing information sources, vehicle-control information receiving the highest urgency, with urgency levels, the urgency levels being processed successively and a plurality of parallel information items being output sequentially within an urgency level. Overall, this information management system protects the vehicle occupant against being overloaded by a multiplicity of simultaneously output information so that in particular information which is critical for safety can also be reliably perceived by the driver of the vehicle.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An information system for communicating vehicle related information to a vehicle occupant, said information system comprising:

a plurality of information sources for outputting respective associated information signals in a form that is intelligible to the vehicle occupant, when associated information-generation conditions are met, wherein:

the plurality of information sources comprises at least two vehicle-control information sources which are of different types for outputting respective vehicle-control information signals to said vehicle occupant; and said associated information generation conditions for each of said information sources are coordinated with associated information generation conditions of other information sources, and comprise a set of activation criteria which are mutually exclusive of activation criteria for said other information sources, based at least in part on status of vehicle operating parameters and on activation status of other information sources, whereby at any time at most a single one of the vehicle-control information sources outputs an associated vehicle-control information item.

2. An information system for communicating vehicle related information to a vehicle, occupant, said information system comprising:
   a plurality of information sources for outputting respective associated information signals in a form that is intelligible to the vehicle occupant, when associated information-generation conditions are met; wherein
      the plurality of information sources comprises at least one vehicle-control information source for outputting an associated vehicle-control information signal, and at least one other information source for outputting a non-vehicle-control-related information signal; and
      an information management device controls information signal outputs of the information sources according to a predefinable prioritization scheme which comprises a plurality of urgency levels;
      each of said information sources is assigned to a respective urgency level according to a permissible vehicle occupant response time to information signals generated thereby;
      said plurality of urgency levels includes one primary urgency level with the highest priority, for outputting at least the at least one vehicle-control information signal, and at least one secondary urgency level for outputting at least the at least one non-vehicle-control information signal; and
         the information management device suppresses outputting of non-vehicle-control information items of the at least one secondary urgency level, or permits them only with reduced intensity, as long as a vehicle-control information signal of the primary urgency level is output.

3. The information system according to claim 2, wherein:
   the plurality of information sources comprises at least two vehicle-control information sources of different types for outputting respective vehicle-control information signals; and
   said associated information generation conditions for each of said information sources are coordinated with associated information generation conditions of other information sources, and comprise a set of activation criteria which are mutually exclusive of activation criteria for said other information sources, based at least in part on status of vehicle operating parameters and on activation status of other information sources, whereby, at any time, at most a single one of the vehicle-control information sources outputs an associated vehicle-control information item.

4. The information system according to claim 2, wherein:
   the information signals which can be output by the respective information sources are assigned to different urgency levels based on associated required response reaction times, such that a response reaction time which is associated with a lower urgency level is longer than a response reaction time which is associated with a higher urgency level; and
   the urgency levels are processed sequentially by the information management device in the order of descending priority of the information which is to be output.

5. The information system according to claim 2, wherein a sequential outputting of respective information items which are present and which are associated with the same respective urgency levels of the one or more secondary urgency levels, is provided under control of the information management device.

6. The information system according to claim 1, further comprising at least one of:
   acoustic outputs for other information with lower priority, which acoustic outputs can be switched to a mute setting during the outputting of vehicle-control information; and
   a provision for reducing intensity of acoustic outputting of non-vehicle-control information signals with a lower priority during acoustic outputting of a respective non-vehicle-control information item with higher priority.

7. The information system according to claim 2, further comprising at least one of:
   acoustic outputs for other information with lower priority, which acoustic outputs can be switched to a mute setting during the outputting of vehicle-control information; and
   a provision for reducing intensity of acoustic outputting of non-vehicle-control information signals with a lower priority during acoustic outputting of a respective non-vehicle-control information item with higher priority.

8. The information system according to claim 2, further comprising a navigation device having at least two groups of navigation information to be output, and which groups are assigned to different urgency levels, with navigation information with higher priority relating to routing in a relatively short-range, and information with lower priority relating to the routing in a relatively more remote range.

9. The information system according to claim 1, wherein an emergency call information signal is provided which can be output with priority over the at least one vehicle-control information item or in parallel with it, with the same priority.

10. The information system according to claim 2, wherein an emergency call information signal is provided which can be output with priority over the at least one vehicle-control information item or in parallel with it, with the same priority.

11. A process for controlling output of signal information from a vehicle information system having a plurality of information sources for communicating information concerning status or required action with regard to vehicle operating systems, comprising:
   grouping said information sources into a plurality of urgency levels according to a permissible vehicle occupant response time to information signals generated thereby;
      within each urgency levels arranging said information source for outputting information signals according to a predetermined prioritization;
      outputting information signals from said information sources first from a highest urgency level grouping sequentially according to said prioritization and subsequently from lower urgency level groupings; and
      suppressing or de-emphasizing information signals of lower priority during output of information signals from a higher priority system.

\* \* \* \* \*